United States Patent [19]
Kohno et al.

[11] Patent Number: 5,958,580
[45] Date of Patent: Sep. 28, 1999

[54] MASKING TAPE OR SHEET

[75] Inventors: Naoki Kohno; Kazuhisa Maeda; Michiro Kawanishi; Kazuhito Okumura, all of Ibaraki, Japan

[73] Assignee: Nitto Denko Corporation, Osaka, Japan

[21] Appl. No.: 08/812,036

[22] Filed: Mar. 6, 1997

[30] Foreign Application Priority Data

Aug. 9, 1996 [JP] Japan ..................................... 8-210885

[51] Int. Cl.⁶ ....................................................... B32B 7/12
[52] U.S. Cl. ................................... 428/343; 428/355 AC; 428/41.3
[58] Field of Search ........................... 428/343, 31, 40.1, 428/41.3, 42.1, 354, 355 AC, 356

[56] References Cited

U.S. PATENT DOCUMENTS

| | | | |
|---|---|---|---|
| 3,993,826 | 11/1976 | Butler et al. | 428/220 |
| 4,137,362 | 1/1979 | Miki et al. | 428/337 |
| 4,263,355 | 4/1981 | Sarkisian | 428/343 X |
| 4,781,957 | 11/1988 | Brown et al. | 428/906 X |
| 5,227,009 | 7/1993 | Sunakawa et al. | |
| 5,246,773 | 9/1993 | Mamish | 428/354 X |
| 5,354,614 | 10/1994 | Cox et al. | 428/906 X |
| 5,374,482 | 12/1994 | Ozari et al. | 428/343 |
| 5,468,533 | 11/1995 | Lipson | 428/343 X |
| 5,516,581 | 5/1996 | Kreckel et al. | 428/343 X |

FOREIGN PATENT DOCUMENTS

| | | |
|---|---|---|
| 0235930 | 9/1987 | European Pat. Off. . |
| 0255866 | 2/1988 | European Pat. Off. . |
| 2242450 | 3/1975 | France . |
| 2258440 | 8/1975 | France . |
| 2830536 | 1/1980 | Germany . |

OTHER PUBLICATIONS

Kirk–Othmer Encyclopedia of Chemical Technology; 3rd Edition, vol. 18, pp. 443, 444, 451. (1962).

*Primary Examiner*—Daniel Zirker
*Attorney, Agent, or Firm*—Sughrue, Mion, Zinn, Macpeak & Seas, PLLC

[57] ABSTRACT

A masking tape or sheet comprising a substrate comprising a resin (a) comprising a polypropylene as a hard segment and an olefin copolymer as a soft segment, and an adhesive layer formed on one side of said substrate. The masking tape of the present invention can precisely follow the shape of adhesion surfaces having curves, and can provide fine parting lines. In particular, when polypropylene resin (b) is added to the resin (a), the back face of the masking tape becomes smooth and can be adhered easily with fingers, and the tape can be easily cut with a cutter knife. Hence, the use of the masking tape of the present invention leads to an improved efficiency of adhesion work, particularly when the work is manually done. In addition, since the masking tape of the present invention does not contain vinyl chloride in the substrate, the masking tape after use can be incinerated without generating a toxic gas such as chlorine gas.

12 Claims, No Drawings

MASKING TAPE OR SHEET

FIELD OF THE INVENTION

The present invention relates to a masking tape or sheet (hereinafter a "masking tape" includes a sheet). More particularly, the present invention relates to a masking tape useful for forming a parting line when coating curved surfaces of automobile bumpers, motorcycle tanks and the like.

BACKGROUND OF THE INVENTION

When coating automobiles and the like, color boundaries are marked with masking tapes. When a masking tape is applied to a curved surface of an automobile bumper, a motorcycle tank and the like, or to an object having raised portions and recessed portions, a masking tape prepared using, as a substrate, a soft vinyl chloride superior in flexibility has been used.

However, a masking tape prepared using soft vinyl chloride as a substrate cannot be simply incinerated after use, since chlorine gas is generated by incineration. To avoid this, a device for removing chlorine gas is required to be set on the incinerator. In view of such problem, a material has been desired which can be incinerated without problems.

A useful substitute for the soft vinyl chloride may be a polyolefin material. Generally speaking, however, polyolefin materials are associated with a problem that, as seen in polyethylene and the like, constriction called "necking" occurs locally when it is drawn, and a straight parting line cannot be formed. In addition, due to low flexibility, polypropylene hardly follows the irregularities in the surface to which it is to be adhered, thus posing another problem besides the necking.

As set forth above, a conventional masking tape-prepared using a polyolefin substrate film cannot produce a sufficient parting line on the above-mentioned surfaces having irregularities.

It is therefore an object of the present invention to provide a masking tape free of the above-mentioned problems, which is capable of precisely following the shape of curved adhesion surfaces of, for example, automobile bumpers and motorcycle tanks, and capable of providing fine parting lines.

SUMMARY OF THE INVENTION

According to the present invention, it has now been found that the use of a resin comprising a hard segment of a certain resin and a soft segment of a certain resin, as a substrate, leads to the production of a masking tape capable of precisely following the shape of curved adhesion surfaces of, for example, automobile bumpers and motorcycle tanks, and capable of providing fine parting lines.

Accordingly, the present invention provides the following.

(1) A masking tape or sheet comprising a substrate comprising a resin (a) comprising a polypropylene as a hard segment and an olefin copolymer as a soft segment, and an adhesive layer formed on one side of said substrate.

(2) The masking tape or sheet of the above (1), wherein the olefin copolymer comprises an ethylene and a monomer component copolymerizable with the ethylene.

(3) The masking tape or sheet of the above (2), wherein the monomer component copolymerizable with ethylene comprises at least one of an α-olefin of the formula : $CH_2=CHR^1$ wherein $R^1$ is an aliphatic group or aromatic group having 1 to 8 carbon atoms, and a diene compound.

(4) The masking tape or sheet of the above (1), wherein the soft segment is contained in a ratio of 30–300 parts by weight per 100 parts by weight of the hard segment.

(5) The masking tape or sheet of the above (1), wherein the olefin copolymer comprises at least a member selected from the group consisting of (a) a copolymer comprising propylene and ethylene, (b) a copolymer comprising propylene and an α-olefin of the formula:
$CH_2=CHR^2$ wherein $R^2$ is an aliphatic group or aromatic group having 2 to 8 carbon atoms, and (c) a copolymer comprising propylene and a diene compound.

(6) The masking tape or sheet of the above (1), wherein the substrate further comprises a polypropylene resin (b).

(7) The masking tape or sheet of the above (6), wherein the polypropylene resin comprises at least one of a homopolypropylene and a random polypropylene.

(8) The masking tape or sheet of the above (6), wherein the polypropylene resin (b) is contained in a ratio of 1–300 parts by weight per 100 parts by weight of the resin (a).

(9) The masking tape or sheet of the above (7), wherein the soft segment is contained in a ratio of 30–300 parts by weight per 100 parts by weight of the hard segment.

(10) The masking tape or sheet of the above (1), wherein the substrate has a size variation after heating same at 150° C. for 1 hour of not more than 20% in at least one of the flow direction and width direction of the substrate.

(11) The masking tape or sheet of the above (1), wherein the substrate has a 10% modulus of 0.3–4.0 $kgf/mm^2$.

(12) The masking tape or sheet of the above (1), wherein the substrate has a multi-layer structure comprising a thermoplastic resin layer in addition to a layer comprising the resin (a).

It is particularly noted that the addition of polypropylene resin (b) to the above-mentioned resin (a) is conducive to an easy adhesion to the adhesion surface by pressing the tape with fingers, due to the slippery back face of the tape, as well as easy cutting of the tape with a cutter knife, etc.

DETAILED DESCRIPTION OF THE INVENTION

The above-mentioned substrate is made from a resin (a) comprising a hard segment and a soft segment, wherein said hard segment is polypropylene and said soft segment is an olefin copolymer.

Examples of the olefin copolymer include a copolymer comprising ethylene and a monomer copolymerizable with ethylene, a copolymer comprising propylene and ethylene, a copolymer comprising propylene and an α-olefin of the formula : $CH_2=CHR^2$ wherein $R^2$ is an aliphatic group or aromatic group having 2 to 8 carbon atoms, a copolymer comprising propylene and a diene compound, and the like.

The monomer copolymerizable with ethylene is preferably at least one of an α-olefin of the formula : $CH_2=CHR^1$ wherein $R^1$ is an aliphatic group or aromatic group having 1 to 8 carbon atoms, and a diene compound.

Examples of the α-olefin include 1-butene, 1-pentene, 4-methyl-1-pentene, 1-hexene, 1-octene, styrene and the like.

Examples of the diene compound include butadiene, 1,4-hexadiene, 1,5-hexadiene, ethylidene, norbonenediene and the like.

$R^1$ is a linear or branched aliphatic group or aromatic group having 1 to 8 carbon atoms, which is exemplified by methyl, ethyl, propyl, isopropyl, butyl, phenyl and the like.

$R^2$ is a linear or branched aliphatic group or aromatic group having 2 to 8 carbon atoms, which is exemplified by ethyl, propyl, isopropyl, butyl, phenyl and the like.

The hard segment and soft segment in resin (a) preferably show superior compatibility with each other, which makes the film easy to be torn and affords superior stress relaxation. These features are preferable in consideration of superior shape-following property of the masking tape and superior separation thereof from the adhesion object. Examples of such resin include a block copolymer having a hard segment and a soft segment, a polymer alloy having a structure such as IPN (interpenetrating polymer network).

The ratio of the soft segment is 30–300 parts by weight, preferably 40–200 parts by weight, relative to 100 parts by weight of the hard segment. When the ratio of the soft segment is less than 30 parts by weight, the flexibility of the substrate tends to become poor and the substrate tends to easily tear. On the other hand, when the ratio of the soft segment exceeds 300 parts by weight, rubber elasticity tends to have too much effect, thereby degrading the workability during peeling of the masking tape.

The polymer constituting the above-mentioned hard segment and soft segment may be homo-, block or random polymer.

The resin (a) may contain other suitable resin(s) to achieve the desired properties of the substrate. In particular, a polypropylene resin (b) may be added to resin (a) comprising the above-mentioned hard segment and soft segment, whereby the elastic modulus of the substrate can be increased.

The polypropylene resin (b) may be either homopolypropylene or random polypropylene. In addition, the both may be mixed for use.

The polypropylene resin (b) to be mixed is not included in the polypropylene component of resin (a) but separately added for the above-mentioned purpose.

When polypropylene resin (b) is added to resin (a) and a film made Stherefrom is used as a substrate of the masking tape, adhesion of the masking tape and cutting performance with a cutter knife can be improved from when a masking tape is prepared using a film made from resin (a) alone.

The ratio of polypropylene resin (b) is 1–300 parts by weight, preferably 10–200 parts by weight, relative to 100 parts by weight of resin (a). When it is contained in a ratio of less than 1 part by weight, the above-mentioned advantages of easy adhesion by pressing the tape with fingers and easy cutting of the tape with a cutter knife etc. tend to be impaired. On the other hand, when it exceeds 300 parts by weight, the flexibility of the substrate may become poor and the masking tape may not follow curved surfaces and objects having raised portions and recessed portions.

The substrate to be used for the masking tape of the present invention may contain, in the resin (a), at least one of inorganic fillers such as titanium oxide, zinc oxide, calcium carbonate and the like, age resistors and antioxidants such as amine, quinoline, hydroquinoline, phenol, phosphites and the like, salicylic acid derivatives, ultraviolet absorbers of benzophenone, benzotriazole and hindered amine derivatives, lubricants, plasticizers and the like, to the extent that such addition does not impair the object of the present invention. The resin (a) is prepared into a film by a known method such as extrusion forming (e.g., inflation, T die, and the like).

Said substrate may have a multi-layer structure wherein a thermoplastic resin is laminated for improving cutting property, rewinding property of the tape and dimensional stability. A layer of a thermoplastic resin may be laminated on one or both side(s) of the above-mentioned substrate of the present invention which is prepared from the resin (a).

Examples of the thermoplastic resin include polyolefin, polyester and nylon resins such as polyethylene, polypropylene, ethylene-vinyl acetate copolymer, ethylene-ethyl acrylate and the like. In particular, a polyolefin containing polypropylene in a proportion of 30% by weight or more, or a modified polyethylene such as modified polyethylene containing carboxyl group, can be used for better adhesion to said substrate.

The masking tape is heated at a temperature of from several dozen degrees to 200° C. in a drying tower after applying a paint. Thus, the substrate preferably shows less dimensional changes such as shrinkage and expansion by heat. To be specific, the substrate preferably has a size variation after heating same at 150° C. for 1 hour of not more than 20%, preferably 0–10%, in at least the flow direction (hereinafter to be referred to as MD direction) or width direction (hereinafter to be referred to as TD direction) of the substrate. When it exceeds 20%, the substrate shrinks to lift the ends of the tape or produces poor parting line. The size variation is determined by previously measuring the size of the substrate in the MD direction and TD direction, heating the substrate by leaving same in an oven at 150° C. for 1 hour, and dividing the difference between the measures of before and after heating with the measure obtained before heating.

Said substrate desirably has 0.3–4.0 kgf/mm², particularly preferably 0.8–2.3 kgf/mm², of 10% modulus in the MD direction (tensile rate 300 mm/min) at 23° C.×65% RH (relative humidity), from the aspects of curve adhesion property and dimensional stability.

When 10% modulus is less than 0.3 kgf/mm², the substrate becomes too soft to cause poor dimensional stability in the tape width, in response to the tension applied for adhesion. When it exceeds 4.0 kgf/mm², the substrate cannot have necessary flexibility, thus making adhesion to curved portions and irregularities difficult.

Said 10% modulus is determined according to the test method of tensile strength and elongation of JIS Z-0237 under the conditions of 23° C., 65% RH for the modulus when the substrate is stretched by 10%.

With regard to the masking tape of the present invention, the adhesive constituting the adhesive layer may be, for example, a natural rubber adhesive, a synthetic rubber adhesive such as acrylic adhesives, SIS (styrene·isoprene block copolymer), SBR (styrene butadiene rubber), IR (isoprene rubber), PIB (polyisobutyrene), IIR (butyl rubber) and the like, or a mixture of a natural rubber adhesive and a synthetic rubber adhesive. Of these, the most preferred are natural rubber adhesives and acrylic adhesives since they are highly cohesive.

The thickness of the above-mentioned substrate is generally about 60–200 μm, and the thickness of the above adhesive layer is generally 5–100 μm, preferably 10–50 μm. When the thickness of the adhesive layer is less than 5 μm, the desired adhesion cannot be obtained and lifting and peeling off of said tape or sheet tend to occur, whereas when it exceeds 100 μm, adhesion becomes too strong to result in poor releasability.

The adhesive is coated on the substrate by a conventional method, such as casting method, roll coater method, reverse coater method, doctor blade method and the like.

The present invention is described in more detail in the following by way of Examples, to which the present invention is not limited.

EXAMPLE 1

A mixture of a resin [70 parts by weight, trademark KS-021P, manufactured by HIMONT, MFR (melt flow rate) 0.8 g/10 min, density 0.7 g/cm$^3$] comprising a hard segment (55 parts by weight) of polypropylene and a soft segment (45 parts by weight) of ethylene-propylene copolymer, and a linear low density polyethylene (MFR 1.5 g/10 min, 30 parts by weight) having a density of 0.924 g/cm$^3$ was extruded to give a substrate having a thickness of 100 μm. The 10% modulus of this substrate in the MD direction was 0.94 kgf/mm$^2$ and size variation after heating at 150° C. for 1 hour was 4% in the MD direction and 3% in the TD direction.

Then, the both surfaces of this substrate underwent corona discharge treatment. An acrylic adhesive was applied on one side of the treated surfaces to a thickness of 15 μm, and a back surface treating agent of a long chain alkyl was applied onto the other surface to give a masking tape.

EXAMPLE 2

In the same manner as in Example 1 except that the resin constituting the substrate was changed to a resin composed of KS-021P (80 parts by weight) and a linear low density polyethylene (20 parts by weight), a substrate was prepared. The 10% modulus of this substrate in the MD direction was 1.0 kgf/mm$^2$ and size variation after heating at 150° C. for 1 hour was 3% in both the MD direction and TD direction.

EXAMPLE 3

In the same manner as in Example 1 except that the substrate was prepared to a have a two layer laminate structure of a 70 μm-thick A layer having the same composition as the resin of Example 1, and a 30 μm-thick B layer of a carboxyl-containing modified polyethylene (trademark HIMILAN 1605, MITSUI PETROCHEMICAL INDUSTRIES, LTD., MFR 2.8 g/10 min), a masking tape was prepared. The 10% modulus of this substrate in the MD direction was 1.3 kgf/mm$^2$ and size variation after heating at 150° C. for 1 hour was 1% in the MD direction and 2% in the TD direction.

EXAMPLE 4

A mixture of a resin (100 parts by weight, trademark CATALLOY KS-221P, manufactured by HIMONT, MFR 2.5 g/10 min) comprising a hard segment (50 parts by weight) of polypropylene and a soft segment (50 parts by weight) of ethylene-propylene copolymer, and homopolypropylene (50 parts by weight) was extruded to give a substrate having a thickness of 100 μm. The 10% modulus of this substrate in the MD direction was 1.3 kgf/mm$^2$ and size variation after heating at 150° C. for 1 hour was 3% in the MD direction.

Then, the both surfaces of this substrate underwent corona discharge treatment. An acrylic adhesive was applied on one side of the treated surfaces to a thickness of 15 μm, and a back surface treating agent of a long chain alkyl was applied onto the other surface to give a masking tape.

EXAMPLE 5

In the same manner as in Example 4 except that the resin constituting the substrate was changed to a resin comprising KS-221P (100 parts by weight) and random polypropylene (100 parts by weight), a masking tape was prepared.

The 10% modulus of this substrate in the MD direction was 1.1 kgf/mm$^2$ and size variation after heating at 150° C. for 1 hour was 4% in the MD direction.

EXAMPLE 6

In the same manner as in Example 4 except that the substrate was prepared to have a two layer laminate structure of a 80 μm-thick A layer having the same composition as the resin of Example 4, and a 20 μm-thick B layer of a carboxyl-containing modified polyethylene (trademark HIMILAN 1605, MITSUI PETROCHEMICAL INDUSTRIES, LTD., MFR 2.8 g/10 min), a masking tape was prepared.

The 10% modulus of this substrate in the MD direction was 1.1 kgf/mm$^2$ and size variation after heating at 150° C. for 1 hour was 4% in the MD direction.

COMPARATIVE EXAMPLE 1

In the same manner as in Example 1 except that the resin constituting the substrate was changed to a homopolypropylene (MFR 3.0 g/10 min, density 0.90 g/cm$^3$), a substrate was prepared. The 10% modulus of this substrate in the MD direction was 4.9 kgf/mm$^2$ and size variation after heating at 150° C. for 1 hour was 1% in both the MD direction and TD direction.

COMPARATIVE EXAMPLE 2

In the same manner as in Example 1 except that the resin constituting the substrate was changed to a linear low density polyethylene (MFR 1.5 g/10 min, density 0.924 cm$^3$), a substrate was prepared. The 10% modulus of this substrate in the MD direction was 0.88 kgf/mm$^2$ and size variation after heating at 150° C. for 1 hour was unmeasurable due to radical shrinkage of the substrate.

The respective masking tapes prepared in the above Examples 1–3 and Comparative Examples 1 and 2 were subjected to the determination for adhesion, 100 R curve adhesion and parting property as in the following. The results are shown in Table 1.

The masking tapes prepared in the above Examples 4–6 and Comparative Example 1 were subjected to the determination for adhesion, cutting performance with a cutter knife, easy adhesion (slipperiness of back face of the tape), 100 R curve adhesion and parting property as in the following. The results are shown in Table 2.

[adhesion]

According to the test method of JIS C-2107, the adhesion was measured at 23° C., 65% RH, pressure load 2 kg, one reciprocation of rubber roller, tensile rate 300 mm/min.

[100R curve adhesion]

A 100 φ circle was drawn on a melamine-coated plate, and a masking tape was adhered along the circumference thereof. The evaluation was made according to the following criteria.

◯: adhesion possible along the circumference, absence of wrinkle and lifting

Δ: presence of wrinkle and lifting to some extent

X: difficult adhesion along the circumference

[parting property]

The masking tapes prepared above were adhered to a melamine-coated plate, and a urethane paint (HIURETHANE No. 5000: NOF Corporation) diluted with a thinner was sprayed with a spray gun to a thickness of 30 μm. After drying at 70° C. for 30 minutes, the tapes were cooled to room temperature and peeled off. The clearness and the linearity of the parting lines were visually examined. The evaluation was made according to the following criteria.

○:clear parting line

Δ: a little intrusion of paint into the area to which the tape was adhered, rather indefinite parting line X: marked intrusion of paint into the area to which the tape was adhered, indefinite parting line

[cutting performance with a cutter knife]

One end of the tapes was adhered to an object and the tapes were retained with the other end loose. The tapes were cut at the center portion thereof with a cutter knife. When the tape was easily cut, it was evaluated ○, when it could be cut but with difficulty, the tape was evaluated Δ, and when it was very difficult to cut the tape, the tape was evaluated X.

[easy adhesion (slipperiness of back face of the tape)]

The tape was adhered to an object by rubbing the back face of the tape with fingers. When the fingers moved smoothly on the back face and the tape was easily adhered, it was evaluated ○ and when the fingers did not move smoothly on the back face and the tape was not easily adhered, it was evaluated X.

TABLE 1

|  | Adhesion (g/15 mm) | 100R curve adhesion | parting property |
|---|---|---|---|
| Example |  |  |  |
| 1 | 210 | ○ | ○ |
| 2 | 230 | ○ | ○ |
| 3 | 270 | ○ | ○ |
| Comparative Example |  |  |  |
| 1 | 340 | X | ○ |
| 2 | 170 | ○ | X |

TABLE 2

|  | Adhesion (g/15 mm) | cutting performance with a cutter knife | easy adhesion | 100R curve adhesion | parting property |
|---|---|---|---|---|---|
| Example 4 | 220 | ○ | ○ | ○ | ○ |
| Example 5 | 210 | ○ | ○ | ○ | ○ |
| Example 6 | 200 | ○ | ○ | ○ | ○ |
| Comparative Ex. 1 | 340 | ○ | ○ | X | ○ |

As is evident from Tables 1 and 2, the tapes of Examples 1–6 satisfied every practical characteristic required as a masking tape.

The masking tape of the present invention can precisely follow the shape of adhesion surfaces having curves, and can provide fine parting lines. In particular, when polypropylene resin (b) is added to resin (a), the back face of the masking tape becomes smooth and can be adhered easily with fingers, and the tape can be easily cut with a cutter knife. Hence, the use of the masking tape of the present invention leads to an improved efficiency of adhesion work, particularly when the work is manually done.

In addition, since the masking tape of the present invention does not contain vinyl chloride in the substrate, the masking tape after use can be incinerated without generating a toxic gas such as chlorine gas.

This application is based on application No. 210885/1996 filed in Japan, the content of which is incorporated hereinto by reference.

What is claimed is:

1. A masking tape or sheet comprising: (1) a substrate comprising a resin (a) containing a polypropylene as a hard segment and an olefin copolymer as a soft segment, wherein said resin (a) is a polymer alloy, and (2) an adhesive layer formed on one side of said substrate.

2. The masking tape or sheet of claim 1, wherein the olefin copolymer comprises the ethylene and a monomer component copolymerizable with the ethylene.

3. The masking tape or sheet of claim 2, wherein the monomer component copolymerizable with ethylene comprises at least one of an α-olefin of the formula : $CH_2=CHR^1$ wherein $R^1$ is an aliphatic group or aromatic group having 1 to 8 carbon atoms, and a diene compound.

4. The masking tape or sheet of claim 1, wherein the soft segment is contained in a ratio of 30–300 parts by weight per 100 parts by weight of the hard segment.

5. The masking tape or sheet of claim 1, wherein the olefin copolymer comprises at least one member selected from the group consisting of (a) a copolymer comprising propylene and ethylene, (b) a copolymer comprising propylene and an α-olefin of the formula;
    $CH_2=CHR^2$ wherein $R^2$ is an aliphatic group or aromatic group having 2 to 8 carbon atoms, and (c) a copolymer comprising propylene and a diene compound.

6. The masking tape or sheet of claim 1, wherein the substrate further comprises a polypropylene resin (b).

7. The masking tape or sheet of claim 6, wherein the polypropylene resin comprises at least one of a homopolypropylene and a random polypropylene.

8. The masking tape or sheet of claim 6, wherein the polypropylene resin (b) is contained in a ratio of 1–300 parts by weight per 100 parts by weight of the resin (a).

9. The masking tape or sheet of claim 7, wherein the soft segment is contained in a ratio of 30–300 parts by weight per 100 parts by weight of the hard segment.

10. The masking tape or sheet of claim 1, wherein the substrate has a size variation of not more than 20% in at least one of the flow direction and width direction of the substrate, after heating said substrate at 150° C. for 1 hour.

11. The masking tape or sheet of claim 1, wherein the substrate has a 10% modulus of 0.3–4.0 kgf/mm².

12. The masking tape or sheet of claim 1, wherein the substrate has a multi-layer structure comprising a thermoplastic resin layer in addition to a layer comprising the resin (a).

* * * * *